United States Patent [19]  [11] 4,089,827
Massy et al.  [45] May 16, 1978

[54] AQUEOUS COATING COMPOSITIONS CONTAINING A MERCAPTAN POLYESTER AND AN AMINOPLAST

[75] Inventors: Derek James Rowland Massy, Linton; Kenneth Winterbottom, Whittlesford, both of England

[73] Assignee: Ciba-Geigy Corporation, Ardsley, N.Y.

[21] Appl. No.: 683,453

[22] Filed: May 5, 1976

[30] Foreign Application Priority Data

May 15, 1975 United Kingdom ............... 20552/75

[51] Int. Cl.$^2$ ............................................. C08L 61/28
[52] U.S. Cl. ........................... 260/29.4 R; 260/22 CQ; 260/29.4 UA; 427/27; 427/385 R; 428/458; 428/460; 428/482
[58] Field of Search ................. 260/29.4 R, 850, 75 S, 260/79.7, 29.4 UA, 22 CQ, 22 T

[56] References Cited

U.S. PATENT DOCUMENTS

| | | | |
|---|---|---|---|
| 1,780,375 | 11/1930 | Bradley et al. | 260/29.2 R |
| 2,527,374 | 10/1950 | Patrick et al. | 260/75 S |
| 2,924,585 | 2/1960 | Schmitz | 260/75 S |
| 3,817,930 | 6/1974 | Villa | 260/75 S |

*Primary Examiner*—Theodore E. Pertilla
*Attorney, Agent, or Firm*—Vincent J. Cavalieri

[57] ABSTRACT

Curable compositions, suitable for use as surface coatings, comprise
(i) 100 parts by weight, calculated on its resin-forming solids content, of an ammonium or amine salt of a carboxyl-containing polyester which contains, on average, at least two mercaptan groups directly attached to aliphatic carbon atoms per molecule and at least one aliphatic group of 8 or more carbon atoms,
(ii) from 5 to 100 parts by weight, calculated on its resin-forming solids content, of a water-soluble aminoplast containing, per average molecule, directly attached to an amido nitrogen atom or atoms of urea or of a polyamino-1,3,5-triazine, at least two groups of formula —CH$_2$OR, where R denotes a hydrogen atom or a methyl or ethyl group, and
(iii) water.

19 Claims, No Drawings

AQUEOUS COATING COMPOSITIONS CONTAINING A MERCAPTAN POLYESTER AND AN AMINOPLAST

DETAILED DISCLOSURE

THIS INVENTION relates to new aqueous compositions, to their use in the production of surface coatings, and to surfaces coated with such compositions.

To obtain the high-performance finish required on objects such as domestic appliances, motor vehicles, and the like, it is customary to use coating compositions which require to be heated to a temperature of e.g., 120° to 200° C, in order to induce cross-linking reactions to take place. Conventional coatings require to be heated for 10 to 30 minutes, depending upon the nature of the coating and the temperature attained. An oil-modified alkyd is normally heated at 150° C for 20 minutes, while a thermosetting acrylic is normally heated for 30 minutes at 180° C.

Cross-linking of the coating converts it into a tough, adherent, and flexible film. Such coatings are usually applied from solution in an organic solvent and cured one on top of another, each coating having a specific function; thus, the first coat, or primer, is generally chosen for its protective effect on the substrate (for example, to prevent metallic corrosion) while the top coat, or finish, is chosen for its decorative effect and for its ability to resist external deleterious influences (abrasion, chemicals, atmospheric attack, etc.)

For reasons of economy, attempts have been made to shorten the heating time required, or to lower the temperature at which the coating must be heated. For this purpose catalysts, especially strong acids, have been incorporated. Such mixtures suffer from having only a limited shelf life, perhaps only a few hours. In addition, the presence of strong acids frequently causes pigment flocculation, resulting in loss of gloss, or a change of shade, or both. There exists, therefore, a need for compositions having a long shelf life, which do not cause pigment flocculation, and which may be cured at a lower temperature and/or for a shorter period than that required for conventional coating formulations to furnish hard and durable coatings.

During heating, the solvent is usually evaporated into the atmosphere. Since organic solvents are relatively expensive and usually environmentally objectionable, there further exists a need for coatings which are applied without such solvents, more particularly from aqueous solution.

Aqueous coating compositions containing an aminoplast and a salt of a mercaptan-free polyester having an aliphatic group of 8 or more carbon atoms are known (see e.g., British patent specifications Nos. 965 659, 1 019 658, 1 083 328, 1 187 118, and 1 196 937, and U.S. Pat. No. 1 780 375); we have found, however, that such compositions require high temperatures for rapid curing.

We have now found that the requirements may be at least substantially met by use of compositions which comprise mixtures in aqueous solution of certain water-soluble aminoplasts and certain mercaptan- and carboxyl group-containing polyesters which are rendered water-soluble as their ammonium or amine salts.

Accordingly, the present invention provides curable compositions, suitable for use as surface coatings, comprising (i) 100 parts by weight, calculated on its resin-forming solids content (as hereinafter defined), of an ammonium or amine salt of a carboxyl-containing polyester which contains, on average, at least two mercaptan groups directly attached to aliphatic carbon atoms per molecule and at least one aliphatic group of 8 or more carbon atoms, (ii) from 5 to 100 parts by weight, calculated on its resin-forming solids content, of a water-soluble aminoplast containing, per average molecule, directly attached to an amido nitrogen atom or atoms of urea or of a polyamino-1,3,5-triazine, at least two groups of formula —$CH_2OR$, where R denotes a hydrogen atom or a methyl or ethyl group, and (iii) water.

This invention also includes within its scope a method of coating a surface which comprises applying a layer of such a composition and heating, preferably to a temperature between 50° and 160° C, especially from 90° to 150° C, and usually from 5 to 90 minutes, particularly up to 30 minutes, in order to effect cross-linking of the composition. At higher temperatures e.g., 160° to 250° C, shorter curing times can be used, such as from 5 minutes to as little as 10 seconds.

Preferably the aliphatic group contains a chain of at least 8 consecutive carbon atoms, optionally interrupted by ether oxygen atoms or carbonyloxy groups, and further preferred are such groups which contain at most 60 carbon atoms.

Still further preferred salts (i) are those of polyesters containing, on average, not more than ten mercaptan groups directly attached to aliphatic carbon atoms per molecule, and having an average molecular weight of between 800 and 20,000, but preferably not more than 10,000, and more particularly between 1500 and 10,000.

The polyesters may be those obtained by esterification of (a) an aliphatic, aromatic, or cycloaliphatic compound containing at least two carboxylic acid groups, or at least one carboxyic anhydride group, preferably from two to six carboxylic acid groups, (b) an aliphatic, cycloaliphatic, or araliphatic compound containing at least two alcoholic hydroxyl groups or at least one 1,2-epoxide group, preferably from two to six alcoholic hydroxyl groups, and, optionally, (c) an aliphatic, aromatic, or cycloaliphatic compound having only one carboxylic acid group, and/or (d) an aliphatic, cycloaliphatic, or araliphatic compound containing only one alcoholic hydroxyl group and preferably not more than eight carbon atoms, at least one of the components having one or more mercaptan groups directly attached to aliphatic carbon atoms, and at least one of (a), (b), and (c) if used, furnishing the said aliphatic group. Further preferred are such polyesters wherein (a) is an aliphatic or cycloaliphatic carboxylic acid or anhydride of 3 to 60 carbon atoms, (b) is an aliphatic alcohol of 2 to 60 carbon atoms, and (c), if used, contains 2 to 25 carbon atoms.

The polyesters may also be those obtainable by the esterification, simultaneously or in any desired sequence, of (e) a saturated or ethylenically unsaturated aliphatic or aliphatic-cycloaliphatic mono-, di-, or tri-carboxylic acid having an aliphatic group as aforesaid, (f) a monomercaptanmonocarboxylic acid of not more than four carbon atoms or a monomercaptanmonohydric alcohol of not more than four carbon atoms, (g) a compound containing two, but not more than two, alcoholic hydroxyl groups per molecule, and (h) a compound containing, per molecule, at least three carboxylic acid groups.

As indicated, components (e), and (g), and (h) may be caused to react to form a hydroxyl- or carboxyl- terminated ester which is then esterified with (f).

The polyesters may also be those obtainable by the esterification, simultaneously or in any desired sequence, of (e) as specified above, (j) a monomercaptandicarboxylic acid, (k) a compound containing at least two, but not more than six, alcoholic hydroxyl groups per molecule, and, optionally, (1) a dicarboxylic acid containing no mercaptan group, or an anhydride of such an acid, and/or (m) a monocarboxylic acid, especially a monomercaptanmonocarboxylic acid of not more than four carbon atoms, and/or (n) a monohydric alcohol, especially a monomercaptanmonohydric alcohol of not more than four carbon atoms.

Similarly, there may be employed polyesters obtainable by the esterification, simultaneously or in any desired sequence, of (e) as specified above, (f) as specified above, (o) a compound containing at least three alcoholic hydroxyl groups per molecule, and (p) a compound containing two, but not more than two, carboxylic acid groups per molecule.

Further polyesters which may be used are those obtainable by the esterification, simultaneously or in any desired sequence, of (j) as specified above, with (q) a compound containing at least two, but not more than six, alcoholic hydroxyl groups per molecule and which contains a chain of at least 8 consecutive carbon atoms which may be interrupted by ether oxygen atoms or carbonyloxy groups, and optionally (f) as specified above.

Still further polyesters which may be used are those obtainable by the esterification of (1) as specified above, with (r) a compound containing, per molecule, at least two alcoholic hydroxyl groups and at least two mercaptan groups, and which contains a chain of at least 8 consecutive carbon atoms which may be interrupted by ether oxygen atoms.

As those skilled in the art of making polyesters will appreciate, a carboxylic anhydride may be used in place of the corresponding carboxylic acid while a 1,2-epoxide (which is the anhydride of a 1,2-diol) may be substituted for a dihydric alcohol, one epoxide group corresponding to two alcoholic hydroxyl groups.

The polyesters may be prepared in a known manner, preferably by heating the reactants together, usually in the presence of a catalyst such as a strong acid (especially an anion exchange resin, toluene-p-sulphonic acid, or sulphuric acid) and optionally with an inert solvent, such as toluene, xylene, trichloroethylene, or perchloroethylene, with which water formed in the reaction can be removed as a codistillate.

Specific examples of acids which may be used as component (c) or (e) are octanoic, decanoic, lauric, myristic, palmitic, stearic, arachidic, behenic, oleic, linoleic, linolenic, ricinoleic, undecylenic, dodecylenic, and tetradecylenic acids, suitably as mixtures, e.g., coconut oil, soya bean oil, and dehydrated castor oil fatty acids, and dimerised and trimerised linoleic acid.

Specific examples of substances containing at least two carboxylic acid groups, or anhydrides thereof, which may be used as component (a) are succinic, adipic, phthalic, dimerised or trimerised linoleic, hexahydrophthalic, sebacic, malic, citric, tricarballylic, and pyromellitic acids, maleinised fatty acids, maleinised dimerised fatty acids, and thiomalic acid, HOOCCH$_2$CH(SH)COOH, otherwise known as mercaptosuccinic acid, and the anhydrides of these acids (where existing).

Preferred monomercaptanmonocarboxylic acids used as component (f) are those of formula

HOOC—R$^1$—SH     I where R$^1$ denotes a divalent organic radical of not more than 3 carbon atoms, the indicated HOOC— group being directly bound to a carbon atom of the radical R$^1$ and the indicated —SH group being directly bound to the same or to a different carbon atom of the radical R$^1$. Preferably they are further of the formula

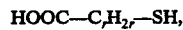

HOOC—C$_r$H$_{2r}$—SH,     II where r is an integer of from 1 to 3. There may thus be used, for example, thioglycollic acid and 2- and 3-mercaptopropionic acids, i.e., r in the above formula is then 1 or 2.

Preferred monomercaptanmonohydric alcohols used as component (f) are those of the general formula

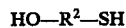

HO—R$^2$—SH     III where R$^2$ denotes a divalent organic radical of not more than 4 carbon atoms, the HO— group and the —SH group being directly bound to carbon atoms of the radical R$^2$. Preferably they are further of the formula

HO—C$_t$H$_{2t}$—SH,     IV where t is an integer of from 2 to 4, and especially preferred are those of the foregoing formula where t is 2 or 3, such as 2-mercaptoethanol, 1-mercaptopropan-2-ol, and 2-mercaptopropan-1-ol, but substances such as 1-chloro-3-mercaptopropan-2-ol may also be used.

Examples of compounds containing at least three carboxylic acid groups, or anhydrides thereof, which may be used as component (h) are citric acid, tricarballylic acid, and pyromellitic acid, trimerised linoleic acid, pyromellitic dianhydride, maleinised fatty acids, and maleinised dimerised fatty acids.

The monomercaptandicarboxylic acid (j) is preferably thiomalic acid.

Examples of suitable substances containing at least two alcoholic hydroxyl groups (b, g, k, o, q) are ethylene glycol, propylene glycol, propane-1,3-diol, butane-1,2-diol, butane-1,3-diol, butane-1,4-diol, di- or tri- ethylene glycols, di- or tri- propylene glycols, and tetrameric or higher ethylene, propylene, and butylene glycols having an average molecular weight of up to 1000, glycerol, 1,1,1-trimethylolethane, 1,1,1-trimethylolpropane, hexane-1,2,5-triol, hexane-1,2,6-triol, 3-hydroxymethylpentane-2,4-diol, pentaerythritol, mannitol, and sorbitol, and adducts of alkylene oxides with the aforementioned polyols. Suitable alkylene oxides for forming these adducts include ethylene oxide, propylene oxide, butylene oxides, tetrahydrofuran, and epichlorohydrin. If desired, the polyhydric alcohol may be treated with one alkylene oxide, say, propylene oxide, and then 'tipped' with a different alkylene oxide such as ethylene oxide. Also suitable are diols and triols based on polycaprolactones.

Examples of suitable mono-1,2-epoxides which may be used in place of a dihydric alcohol are: ethylene oxide, propylene oxide, butylene oxide, 1,1-dimethylethylene oxide, epichlorohydrin, glycidyl ethers of alcohols (such as n-butyl and iso-octyl glycidyl ethers) or of phenols (such as phenyl and p-tolyl glycidyl ethers), N-glycidyl compounds (such as N-glycidyl-N-methylaniline or N-glycidyl-n-butylamine), and glycidyl esters of carboxylic acids (such as glycidyl acetate or the glycidyl esters of mixed, branched $C_7$ to $C_9$ tertiary aliphatic monocarboxylic acids).

In place of trihydric and higher alcohols there may be used monoepoxymonohydric alcohols such as glycidol or diepoxides such as a diglycidyl ether of an alcohol or phenol.

Dicarboxylic acids containing no mercaptan group (1) which may be used preferably have the formula $$\text{HOOC}-R^3-\text{COOH} \qquad \text{VI}$$

where $R^3$ represents a divalent aliphatic, aromatic, or alicyclic residue, and include succinic, adipic, phthalic, hexahydrophthalic, sebacic, and malic acids.

The dicarboxylic acids (p) and their anhydrides may be selected from those listed above for (1) and also the mercaptan-containing dicarboxylic acid (j) and their anhydrides.

It is often desirable, when preparing a polymercaptan ester for use in the present invention, to incorporate a monofunctional compound such as a monocarboxylic acid and/or a monohydric alcohol (d,m, and n) as a chain-terminator. It is especially advantageous to use as chain-terminator a compound which contains a mercaptan group, examples being monomercaptanmonocarboxylic acids and monomercaptanmonohydric alcohols and, more specifically, thioglycollic acid, 2-mercaptopropionic acid, 3-mercaptopropionic acid, 2-mercaptoethanol, and 2-mercaptopropan-1-ol.

Examples of suitable hydroxymercaptans (r) are tris(3-mercapto-2-hydroxypropyl) ethers of poly(oxypropylene) triols.

The salts (i) of the polyesters are conveniently prepared by addition of 50% to 150% of the theoretical quantity (based on the carboxyl content of the polyester) of ammonia, a quaternary ammonium hydroxide, or an amine, to the ester or vice versa, the ammonia, quaternary ammonium hydroxide, or amine being used in aqueous solution if desired. Suitable amines include primary, secondary, or tertiary alkylamines, alkanolamines, cycloaliphatic amines, and N-heterocyclic amines, preferably of not more than 40 carbon atoms, especially ethylamine, diethylamine, triethylamine, ethanolamine, diethanolamine, triethanolamine, n-, iso-, sec.-, and tert.- butylamine, N,N-dimethylstearylamine, morpholine, piperazine, cyclohexylamine, and tri-isopropanolamine.

Examples of suitable aminoplasts (ii) are the N-hydroxymethyl and N-methoxymethyl derivatives of urea, melamine, and aminotriazines such as acetoguanamine, benzoguanamine, and lauroguanamine. If desired, aminoplasts containing both N-hydroxymethyl and N-methoxymethyl or N-ethoxymethyl groups may be used (for example, a hexamethylol melamine in which from 2 to 5 of the methylol groups have been so etherified).

The weight ratio of mercaptan-containing polyester salt to etherified aminoplast will vary, with the limits specified, according to the properties required in the cured and uncured compositions. Generally, a preferred range is 10 to 60 parts of the aminoplast per 100 parts of the salt, all parts being by weight calculated on the resin-forming solids content.

The amount of water used as component (iii) of the composition may vary between wide limits, and to find the most stationary amount for a particular application is within the routine skill of a surface coating technologist. Generally, the compositions contain 10 to 90% by weight of water, especially 20 to 60%.

Other water-soluble or water-dispersed film-forming substances may also be included, such as alkyd resins and acrylic resins. The amount of such materials may likewise vary between wide limits but should not be so great as to mask the advantageous properties of the compositions. Typically, additions of up to 50%, and preferably up to 30%, may be used, these percentages being based on the resin-forming solids content of the materials.

By the term "resin-forming solids content", as used throughout the present specification and the claims thereto, is meant the percentage residue left after a 1 g sample of material has been heated in a 5 cm diameter open dish in an oven at 120° C for 3 hours at atmospheric pressure.

This invention further comprises surfaces coated with a composition of this invention, both in the cured and uncured states. Such surfaces are preferably of primed or unprimed metal, especially a ferrous metal, but may also be of wood or synthetic materials.

The compositions may be applied by immersion, brushing, rollering, spraying (including electrostatic spraying), or by any other conventional means. They may, if desired, include pigments and dyes. Other materials which may be incorporated include extenders, such as calcium carbonate, calcium sulphate, barium sulphate, and magnesium silicate, surface-active agents, and plasticisers. They may also, if desired, contain strong acids, e.g., aromatic sulphonic acids or their amine or ammonium salts as catalysts.

The invention is illustrated by the following Examples in which all parts are by weight and temperatures are in degrees Celsius. Ratios of the components of the compositions are expressed in terms of the weight of the salt (i) of the polyester.

The materials used in the Examples were prepared as follows:

MERCAPTAN A

The following were mixed at room temperature:

| | |
|---|---|
| phthalic anhydride | 161.8 g |
| coconut oil fatty acid | 82.6 g |
| glycerol | 39 g |
| pentaerythritol | 57.7 g |
| thioglycollic acid (94.5%) | 40.6 g |
| xylene | 50 g |

The mixture was kept under nitrogen and heated under reflux (145° - 175°), removing continuously the water generated. After 10½ hours the calculated quantity of water (28 g) had been evolved and the mixture was then allowed to cool to 100°. The xylene present was then removed by distillation under reduced pressure and finally the product was diluted with 80 g of 2-methoxyethanol to give Mercaptan A, a solution having a resin-forming solids content of 80%. It had an acid value of 0.73 equiv./kg, a thiol value of 0.78 equiv./kg, and a viscosity at 25° of 51.5 Pas (pascal-seconds).

Mercaptans B - I were prepared in a similar manner to Mercaptan A, starting from the following:

TABLE 1

|  | Parts by weight in Mercaptan | | | | | | | |
|---|---|---|---|---|---|---|---|---|
|  | B | C | D | E | F | G | H | I |
| phthalic anhydride | 148 | 104.6 | 133.2 | 148 | 98.7 | 74 | 98.7 | 98.7 |
| coconut oil fatty acid | — | 95.2 | 164 | 205 | 205 | 136.7 | 205 | 205 |
| glycerol | — | 37.7 | 36.8 | — | — | 30.7 | — | — |
| pentaerythritol | 121 | 55.7 | 54.4 | 122.4 | 90.7 | 45.3 | 102 | 102 |
| thioglycollic acid (94.5%) | 38.9 | 39.8 | 39.0 | 38.9 | 32.5 | 32.5 | 64.9 | 64.9 |
| dimerised linoleic acid | — | 49.7 | — | — | — | 101 | — | — |
| soya bean oil fatty acid | 220 | — | — | — | — | — | — | — |
| xylene | 30 | 25 | 26.5 | 34 | 30 | 30 | 30 | 30 |
| 2-methoxyethanol | 124 | 90 | 100 | 120 | 99 | 99 | 109 | 111 |

The products, which all had resin-forming solids contents of 80%, had the following properties:

TABLE 2

|  | Mercaptan | | | | | | | |
|---|---|---|---|---|---|---|---|---|
|  | B | C | D | E | F | G | H | I |
| acid value (equiv./kg) | 0.45 | 0.66 | 1.02 | 0.72 | 0.52 | 0.54 | 0.77 | 1.14 |
| thiol value (equiv./kg) | 0.29 | 0.73 | 0.62 | 0.53 | 0.48 | 0.46 | 0.96 | 1.07 |
| viscosity at 25° (mPas) | 8350 | 2300 | 835 | 1612 | 590 | 1094 | 275 | 218 |

MERCAPTAN J

The following were mixed at room temperature

| poly(oxypropylene) triol, average molecular weight 600 | 300 g |
|---|---|
| mercaptosuccinic acid | 225 g |
| toluene-p-sulphonic acid | 0.5 g |
| xylene | 100 g |

The mixture was kept under nitrogen and heated to reflux (150° – 160°), the water generated being removed azeotropically. After 3½ hours the calculated quantity of water (27.1 g) had been evolved and the mixture was allowed to cool to 100°. The xylene present was then removed by distillation under reduced pressure and finally the product was diluted to 80% resin-forming solids content with 123 g of 2-methoxyethyl acetate. Mercaptan J had an acid value of 2.33 equiv./kg, a thiol value of 2.13 equiv./kg, and a viscosity of 6150 mPas at 25°.

MERCAPTAN K

Mercaptan K was prepared in a similar manner to Mercaptan J but the poly(oxypropylene) triol was replaced by 155 g of a similar material of average molecular weight 310. After removal of xylene the product was diluted to 80% resin-forming solids content with 88 g of 2-methoxyethyl acetate. Mercaptan K had an acid value of 3.91 equiv./kg, a thiol value of 3.10 equiv./kg, and a viscosity of 26.5 Pas at 25°.

MERCAPTAN L

A commercially available poly(2-hydroxy-3-mercaptopropyl) ether, prepared from a poly(oxypropylene) triol of average molecular weight 530, epichlorohydrin, and sodium hydrosulphide (as described in U.S. Pat. No. 3,258,495) (200 g, 0.25 mole) was mixed with succinic anhydride (75 g, 0.75 mole) in the presence of N,N-dimethyldodecylamine (3 g) as catalyst and toluene (100 g). The mixture was heated under reflux with stirring for 2½ hours, cooled, washed with water and then the solvent was removed by distillation in vacuo. The residue, Polymercaptan L, had an acid value of 2.68 equiv./kg and a thiol value of 2.19 equiv./kg.

MERCAPTAN M

The following were mixed at room temperature

| trimellitic anhydride | 57.6 | g |
|---|---|---|
| neopentyl glycol | 92.3 | g |
| isophthalic acid | 55.2 | g |
| coconut oil fatty acid | 102.4 | g |
| glycerol | 40.8 | g |
| thioglycollic acid | 40.8 | g |
| xylene | 40 | g |

The mixture was kept under nitrogen and heated under reflux (144° – 160°), removing continuously the water generated. After 11½ hours the calculated quantity of water (39.7 g) had been removed, and the solution in the flask had an acid value of 0.05 equiv./kg. The solution was cooled to 100°, trimellitic anhydride (38.4 g) was added, and heating was continued at 160° until the solution had an acid value of 0.94 equiv./kg which took about 1½ hours. The xylene was removed by distillation under reduced pressure and finally the product was diluted with 2-n-butoxyethanol (166 g) to give Mercaptan M, a solution having a resin-forming solids content of 70%. Its acid value was 0.67 equiv./kg, its thiol value was 0.55 equiv./kg, and its viscosity at 25° was 4.26 Pas.

MERCAPTAN N was prepared in a similar manner to Mercaptan M from the following:

| trimellitic anhydride | 57.6 | g |
|---|---|---|
| neopentyl glycol | 69.2 | g |
| isophthalic acid | 55.2 | g |
| coconut oil fatty acid | 102.4 | g |
| glycerol | 61.2 | g |
| thioglycollic acid | 61.2 | g |
| xylene | 40 | g |

In the first stage 42.4 g of water was collected.

Trimellitic anhydride (38.4 g) was added, and heating was continued at 160° until the solution had an acid value of 0.92 equiv./kg. Xylene was removed under vacuum and finally 2-n-butoxyethanol (172.6 g) was added to give a solution of 70% resin-forming solids content.

The product had an acid value of 0.71 equiv./kg, a thiol value of 0.73 equiv./kg, and a viscosity of 7.35 Pas at 25°.

MERCAPTON O

The following were mixed at room temperature:

| | | |
|---|---|---|
| isophthalic acid | 129.2 g | |
| adipic acid | 37.6 g | |
| glycidyl esters of mixed aliphatic C$_7$ and C$_9$ tertiary monocarboxylic acids (epoxide content 3.95 equiv./kg) | 159.6 g | |

The mixture was kept under nitrogen and heated to 180°. The temperature was maintained at that level for 1 hour, at which time the epoxide value of the mixture had fallen to 0.01 equiv./kg. The mixture was cooled to 100° and the following were added:

| | | |
|---|---|---|
| neopentyl glycol | 45.5 | g |
| trimellitic anhydride | 17.2 | g |
| glycerol | 19.9 | g |
| thioglycollic acid | 19.9 | g |
| xylene | 30 | g |

The solution was heated under reflux (185°), removing continuously the water generated. After 6½ hours 31 g of water had been collected and the solution has an acid value of 0.27 equiv./kg. The solution was cooled to 140° and trimellitic anhydride (17.2 g) was added. The solution was warmed to 160° for 1 hour, at which time the solution had an acid value of 0.70 equiv./kg.

Xylene present was removed by distillation under reduced pressure and finally the product was diluted with 2-n-butoxyethanol (178 g) to give Mercaptan O, a solution having a resin-forming solids content of 70%. It had an acid value of 0.55 equiv./kg, a thiol value of 0.23 equiv./kg, and viscosity of 6.7 Pas at 25°.

MERCAPTAN P

Mercaptan P was made in a similar manner to Mercaptan O, except that the quantities of neopentyl glycol, glycerol, and thioglycollic acid used were each 29.9 g. The product had an acid value of 0.55 equiv./kg, a thiol value of 0.37 equiv./kg, and a viscosity of 9.9 Pas at 25°.

Mercaptan Q

The following were mixed at room temperature:

| | | |
|---|---|---|
| isophthalic acid | 129.2 g | |
| adipic acid | 37.6 g | |
| glycidyl esters of mixed aliphatic C$_7$ and C$_9$ tertiary monocarboxylic acids (epoxide content 3.95 equiv./kg) | 159.6 g | |

The mixture was kept under nitrogen and heated to 180°. The temperature was maintained at 180° for 1 hour until the mixture had a negligible epoxide content. The mixture was cooled to 100° and

| | | |
|---|---|---|
| neopentyl glycol | 13.0 g | |
| glycerol | 44.85 g | |

| | | |
|---|---|---|
| thioglycollic acid (91%) | 49.5 g | | were added. The mixture was heated to reflux (190°), removing continuously the water generated. After 12 hours 36.2 g of water had been collected and the solution had an acid value of 0.15 equiv./kg. The solution was cooled to 100° and trimellitic anhydride (34.4 g) was added. The mixture was heated to 160° for 3 hours, when its acid value was 0.89 equiv./kg. Xylene was removed by distillation under reduced pressure and the product was diluted with 2-n-butoxyethanol (183 g) to give a product of 70% resin-forming solids content. The product had an acid value of 0.60 equiv./kg, a thiol value of 0.51 equiv./kg, and a viscosity of 3.6 Pas at 25°.

MERCAPTAN R

The following were mixed at room temperature:

| | | |
|---|---|---|
| trimellitic anhydride | 139.9 | g |
| butane-1,4-diol | 133.6 | g |
| coconut oil fatty acid | 82.6 | g |
| thioglycollic acid (88.3%) | 44.2 | g |
| xylene | 30 | g |

The mixture was kept under nitrogen and heated to reflux (140°). Heating was continued at reflux (140° – 175°) for 5 hours, removing continuously the water generated (38.7 g). The solution had an acid value of 1.02 equiv./kg. Xylene was removed by distillation under reduced pressure and the product was diluted with 2-n-butoxyethanol (90.3 g) to give a product of 80% resin-forming solids content. The product had an acid value of 0.84 equiv./kg and a thiol value of 0.80 equiv./kg.

MERCAPTAN S

Mercaptan S was prepared in a similar manner to Mercaptan R, from the following:

| | | |
|---|---|---|
| phthalic anhydride | 121.3 | g |
| thiomalic acid | 41.0 | g |
| coconut oil fatty acid | 82.6 | g |
| pentaerythritol | 57.7 | g |
| glycerol | 39 | g |
| thioglycollic acid (88.3%) | 44.2 | g |
| xylene | 30 | g |

The amount of water collected was 33.8 g, after a reaction time of 4 hours. The solution, which had an acid value of 1.02 equiv./kg, was stripped of xylene under reduced pressure and finally diluted with 2-n-butoxyethanol (87 g) to give Mercaptan S of 80% resin-forming solids content. Mercaptan S had an acid value of 0.88 equiv./kg. and a thiol value of 1.12 equiv./kg.

MERCAPTAN T

Mercaptan T was made in a similar manner to Mercaptan R, from the following

| | | |
|---|---|---|
| phthalic anhydride | 90.7 | g |
| thiomalic acid | 63.6 | g |
| coconut oil fatty acid | 82.4 | g |
| glycerol | 85.9 | g |
| xylene | 30 | g |

After refluxing the mixture for 2½ hours, 28.3 g of water had been collected and the solution had an acid value of 0.97 equiv./kg. Xylene was removed by distillation under reduced pressure and finally 2-butoxyethanol (71.7 g) was added to give Mercaptan T as a solution of 80% resin-forming solids content. Mercaptan T had an acid value of 0.79 equiv./kg and a thiol value of 0.99 equiv./kg.

Esters I-III were prepared for purposes of comparison.

ESTER I

The following were mixed at room temperature:

| | |
|---|---|
| isophthalic acid | 129.2 g |
| adipic acid | 37.6 g |
| glycidyl esters of mixed aliphatic C$_7$ and C$_9$ tertiary monocarboxylic acids, epoxide content 3.95 equiv./kg. | 159.6 g |

The mixture was kept under nitrogen and heated to 180°. Reaction was continued at 180° for 45 minutes, at which time the residual epoxy value was 0.01 equiv./kg. The mixture was cooled to 100° and

| | |
|---|---|
| neopentyl glycol | 67.6 g |
| trimellitic anhydride | 17.2 g |
| xylene | 20 g | were added. The mixture was warmed to reflux (183°) and water generated (28.7 g) was removed continuously over 10¼ hours. The solution had an acid value of 0.32 equiv./kg. After cooling to 140°, trimellitic anhydride (17.2 g) was added and heating was continued for ½ hour at 180°, at which time the acid value was 0.64 equiv./kg. Xylene was removed by distillation under reduced pressure and finally 2-n-butoxyethanol (171 g) was added to give Ester I, a solution having a resin-forming solids content of 70%. It had an acid value of 0.48 equiv./kg and a viscosity of 6.9 Pas at 25°.

ESTER II

The following were mixed at room temperature:

| | |
|---|---|
| trimellitic anhydride | 57.6 g |
| neopentyl glycol | 138.4 g |
| isophthalic acid | 55.2 g |
| coconut oil fatty acid | 102.4 g |
| xylene | 30 g |

The mixture was kept under nitrogen and heated under reflux (163° – 195°), removing continuously the water generated. After 7½ hours, 43 ml of water had been collected. The solution was cooled to 140° and trimellitic anhydride (38.4 g) was added. The solution was warmed to reflux for 1 hour. Xylene was removed by distillation under reduced pressure and 2-n-butoxyethanol (150 g) was added to give Ester II, a solution having a resin-forming solids content of 70%. It had an acid value of 0.70 equiv./kg and a viscosity of 2.95 Pas at 25°.

ESTER III

The following were mixed at room temperature:

| | |
|---|---|
| phthalic anhydride | 90.7 g |
| succinic acid | 50.0 g |
| coconut oil fatty acid | 82.4 g |
| glycerol | 85.9 g |
| xylene | 30 g |

The mixture was kept under nitrogen and heated to reflux (162°). Water which was generated (29.3 g) was continuously removed over a period of 2½ hours. The solution had an acid value of 0.94 equiv./kg. Xylene was removed by distillation under reduced pressure and finally 2-n-butoxyethanol (71.1 g) was added to give Ester III of 80% resin-forming solids content. Ester III had an acid value of 0.78 equiv./kg.

AMINOPLAST I

The following were mixed at room temperature:

| | |
|---|---|
| melamine | 126 g |
| 37% aqueous formaldehyde solution | 456 g |
| 4% aqueous caustic soda solution | 2 ml |

The mixture was heated to reflux for ½ hour. The solution was cooled to 60° and methanol (428 g) was added, the solution was cooled to 40°, and conc. hydrochloric acid (5 ml) was added. The reaction was continued at 40° for ½ hour and then the solution was adjusted to pH 9.0 with 20% caustic soda solution. The excess of methanol and water was removed by distillation under reduced pressure. Distillation was continued until the residue in the flask had a viscosity of 400 mPas at 25°. The product was infinitely soluble in water and had a resin-forming solids content of 75%: it contained about two methoxymethyl and three hydroxymethyl groups on average per melamine residue.

AMINOPLAST II

This is a solution of 80% resin-forming solids content of a methylated urea-formaldehyde resin in isopropanol.

AMINOPLAST III

This is a methylated hexamethylol melamine having approximately 4.0 methoxymethyl groups and 1.5 hydroxymethyl groups per melamine residue. It has a resin-forming solids content of 100% and a viscosity of 10 Pas at 25°.

In some of the Examples, tests were carried out on the cured films as follows:

HARDNESS

This was determined using a Persoz pendulum as described in ISO recommendation 1522.

FLEXURE

Resistance to bending was determining by the method described in British Standard No. 3900 Part E1 (1966), using mandrels of various diameters.

REVERSE IMPACT

This was tested as described in British Standard No. 3900, Part E3

GLOSS

The specular reflection value was obtained by the method set out in British Standard No. 3900 Part D2 (1967), using a 60° angle of incidence.

ADHESION

This was determined by means of an Epprecht Twistometer.

ERICHSEN VALUES

These were determined with a standard Erichsen Distensometer.

EXAMPLE 1

Mercaptan L (36.6 g) and 33% aqueous ammonia solution (7.0 g) were mixed together at room temperature. Aminoplast I (8.5 g) was added, followed by water (25 g), and the solution was thoroughly mixed. This composition corresponds to a Mercaptan:Aminoplast ratio of 85:16.4 (based on resin-forming solids content). The composition was coated onto tin-plated steel sheets so as to leave a film of 100 μm thickness (wet). These sheets were immediately placed in an oven at a temperature of 50° or 100° and at 5 minute intervals sheets were removed and the degree of cure was assessed by a conventional method, viz. rubbing the coating 20 times with a swab of cotton wool soaked in 2-ethoxyethanol or ethyl methyl ketone. The results were as follows:

TABLE 2

|                   | Resistant after (minutes) at | |
|-------------------|------|------|
|                   | 100° | 50°  |
| 2-ethoxyethanol   | 10   | 150  |
| ethyl methyl ketone | 15 | 270  |

EXAMPLE 2

Mercaptan J (12.5 g) and 10% aqueous ammonium hydroxide solution (10.0 g) were mixed together at room temperature. To this mixture was added Aminoplast I (3.33 g) and the whole was mixed again. This mixture corresponds to a Mercaptan:Aminoplast ratio of 100:22.7 (based on resin-forming solids content). As in Example 1, the solution was coated on to tin-plated steel sheets and cured at 100° in a fanned oven. The degree of cure was assessed by rubbing the film with ethyl methyl ketone as before. The film was resistant to ethyl methyl ketone after curing for 15 minutes.

EXAMPLE 3

Mercaptans A — I were each mixed with the theoretical quantity of aqueous ammonium hydroxide solution to form the ammonium salt of the Mercaptans. Aminoplast I was added so as to obtain a Mercaptan:Aminoplast ratio of 100:25 (based on resin-forming solids content) and the solution was diluted with the appropriate quantity of water to give a final total resin-forming solids content of 65%. The solutions were applied to glass and to tin-plated steel sheets to give a film thickness of 75 μm (wet) and then the sheets were immediately placed in a fanned oven at 130° for 20 minutes to cure the films. The sheets were then conditioned overnight in an atmosphere of 65% relative humidity and at 20°. The degree of cure was assessed by rubbing the coating 20 times with a swab of cotton wool soaked in acetone and noting the effect on the coating. Results of this and other tests carried out are recorded in Table 3.

TABLE 3

| Mercaptan | Hardness (seconds) | Flexure mm. | Acetone |
|-----------|--------------------|-------------|---------|
| A | 277 | 12.5 | no effect |
| B | 237 | 3.2 | very slightly softened |
| C | 217 | 6.4 | very slightly softened |
| D | 179 | 1.6 | softened |
| E | 208 | 8.0 | very slightly softened |
| F | 84 | 1.6 | softened |
| G | 114 | 1.6 | softened |
| H | 156 | 1.6 | slightly softened |
| I | 214 | 4.8 | slightly softened |

EXAMPLE 4

Mercaptan A was mixed with the theoretical quantity of aqueous ammonium hydroxide solution to form the ammonium salt of Mercaptan A. Aminoplast II was added so as to obtain Mercaptan:Aminoplast ratios of 100:24.6 and 100:42 (based on the resin-forming solids contents) and the solutions were diluted with the appropriate quantity of water to give a final total resin-forming solids content of 65%. These diluted solutions were applied to glass and to tin-plated steel sheets to give a film thickness of 75 μm (wet) and the sheets were immediately placed in a fanned oven at 130° for 20 minutes to cure the films. The sheets were then conditioned overnight in an atmosphere of 65% relative humidity and at 20°. The degree of cure was assessed by rubbing the coating 20 times with a swab of cotton wool soaked in acetone and noting the effect on the coating. The results of this and other tests carried out are recorded in Table 4.

TABLE 4

| Mercaptan:Aminoplast | Hardness (seconds) | Flexure mm | Effect of treatment with acetone |
|----------------------|--------------------|------------|----------------------------------|
| 100:24.6 | 277 | 3.2 | none |
| 150:42 | 299 | 8.0 | none |

EXAMPLE 5

Mercaptans M to P and Esters I and II (75.2 parts) were each mixed separately with titanium dioxide (rutile) pigment (36.8 parts) and the mixtures were ball-milled to disperse the pigment. Aminoplast III (9.25 parts), water (82 parts), and N,N-diethylaminoethanol (as indicated in Table 5) were added and mixed.

TABLE 5

| Mercaptan or Ester | Ratio to Aminoplast | Quantity of amine (parts) |
|--------------------|---------------------|---------------------------|
| Mercaptan M | 100:15.0 | 9.14 |
| Mercaptan N | 100:14.9 | 9.60 |
| Mercaptan O | 100:15.4 | 7.5 |
| Mercaptan P | 100:15.4 | 7.5 |
| Ester I | 100:15.6 | 6.68 |
| Ester II | 100:14.9 | 9.56 |

The mixtures were applied to tin-plated steel sheets to give a film thickness of 125 μm (wet). These sheet were immediately placed in a fanned oven at 150° and at 5 minute intervals the degree of cure was assessed by ascertaining the resistance to acetone, the coating being rubbed 20 times with a swab of cotton wool soaked in the solvent. The results were as follows:

TABLE 6

| Mercaptan or Ester | Resistant after (minutes) |
|--------------------|---------------------------|
| Mercaptan M | 15 |
| Mercaptan N | 10 |
| Mercaptan O | 30 |
| Mercaptan P | 15 |

TABLE 6-continued

| Mercaptan or Ester | Resistant after (minutes) |
|---|---|
| Ester I | 50 |
| Ester II | >60 |

That the mixtures containing the polymercaptan-free polyesters, Esters I and II, took much longer to cure fully, is immediately apparent from this Table.

EXAMPLE 6

The pigmented compositions of Example 5 were similarly applied to tin-plated steel sheets and were then cured by heating in a fanned oven for the times and temperatures stated in Table 7. The sheets were conditioned overnight in an atmosphere of 65% relative humidity and at 20°, and the degree of cure was assessed by rubbing the coating 20 times with a swab of cotton wool soaked in acetone and noting the effect on the coating. Results of this and other tests are recorded in Table 7.

Table 7

| Mercaptan of Ester | Cure Conditions Time (min.) | Temp. ° | Acetone | Hardness (secs.) | Flexure (mm) | Reverse Impact (mm) | Gloss (%) | Adhesive MPa |
|---|---|---|---|---|---|---|---|---|
| Mercaptan M | 30 | 135 | no effect | 161 | <1.6 | 2.5 | 95 | 32 |
| Mercaptan N | 30 | 135 | no effect | 174 | <1.6 | 2.5 | 85 | 30 |
| Mercaptan O | 60 | 135 | no effect | 210 | <1.6 | 3.75 | 110 | 35 |
| Mercaptan P | 45 | 135 | no effect | 227 | <1.6 | 3.75 | 110 | 35 |
| Ester I | 60 | 155 | slightly softened | 198 | <1.6 | 4.5 | 95 | 27 |
| Ester II | 60 | 180 | softened | 76 | <1.6 | <1.25 | 75 | — |

—denotes not tested

Exterior weathering of the coated steel sheets had no effect over 5 months.

EXAMPLE 7

Mercaptan Q (75.2 parts) and titanium dioxide (rutile) (36.8 parts) were ball-milled to disperse the pigment. Aminoplast III (9.25 parts), water (82 parts), and N,N-diethylaminoethanol (8.2 parts) were mixed in (Mercaptan:Aminoplast ratio, 100:15.2) and the mixture was applied to tin-plated steel sheets to a film thickness of 125 μm (wet). The sheets were placed in a fanned oven at 130° or 150°, and at 5 minute intervals the sheets were removed and the degree of cure was assessed by rubbing the coating 20 times with a swab of cotton wool soaked in acetone. The results were as follows:

TABLE 8

| Cure temperature | Resistant after (minutes) |
|---|---|
| 130° | 40 |
| 150° | 10 |

EXAMPLE 8

The pigmented composition described in Example 7 was similarly applied to tin-plated steel sheets which were immediately placed in a fanned oven at 150° for 10 minutes. The sheets were then conditioned overnight in an atmosphere of 65% relative humidity and at 20°. The results of tests carried out on the coated sheets are recorded in Table 9.

TABLE 9

| Gloss (%) | 100 |
|---|---|
| Hardness (seconds) | 195 |
| Reverse Impact (mm) | 3.8 |
| Erichsen (mm) | >7.0 (tin-plate failed) |

In another composition the titanium dioxide was replaced by red iron oxide (75 parts) and the coating was applied as a priming coat to untreated steel sheets. The cure conditions and subsequent treatment were as described above. The results of tests carried out on the coating are described in Table 10.

TABLE 10

| Gloss (%) | 30 |
|---|---|
| Erichsen (mm) | 6.4 |
| Reverse Impact (mm) | 3.14 |

EXAMPLE 9

The N,N-diethylaminoethanol salts of Mercaptans R, S, and T and Ester III were prepared by mixing 8.5 g of the Mercaptan or Ester with, respectively, 0.842, 0.885, and 0.793, and 0.780 g of N,N-diethylaminoethanol. Aminoplast III was added to a Mercaptan:Aminoplast or Ester:Aminoplast ratio of 100:22.2, 100:22.1, 100:22.4, and 100:22.4, respectively, (based on resin-forming solids content) and each solution was diluted with water to give a final total resin-forming solids content of 50%. The solutions were applied to tin-plated steel to give a wet film thickness of 100 μm and the plates were immediately placed in a fanned oven at 140° for 15 minutes to cure the films. The plates were conditioned overnight in an atmosphere of 65% relative humidity and at 20°. The appearance of the film was noted and the degree of cure was assessed by rubbing the coating 20 times with a swab of cotton wool soaked in acetone and noting the effect on the coating. These results and of other tests are recorded in Table 11.

TABLE 11

| | Appearance | Acetone | Hardness (seconds) | Flexure (mm) |
|---|---|---|---|---|
| Mercaptan R | clear, glossy | No effect | 102 | <1.6 |
| Mercaptan S | clear, glossy | No effect | 235 | <1.6 |
| Mercaptan T | clear, glossy | No effect | 170 | <1.6 |
| Ester III | clear, glossy | Soft, friable | 70 | <1.6 |

Similar results could be obtained using a salt prepared from Mercaptan S (8.5 g) and triethylamine (0.76 g), morpholine (0.65 g), triethanolamine (1.12 g), or tri-isopropanolamine (1.44 g).

We claim:
1. A curable composition comprising

(i) 100 parts by weight, calculated on its resin-forming solids content, of an water soluble ammonium or amine salt of a carboxyl-containing polyester which contains, on average, at least two mercaptan groups directly attached to aliphatic carbon atoms per molecule and at least one aliphatic group of at least 8 and at most 60 carbon atoms, (ii) from 5 to 100 parts by weight, calculated on its resin-forming solids content, of a water-soluble aminoplast containing, per average molecule, directly attached to an amido nitrogen atom or atoms of urea or of a polyamino-1,3,5-triazine, at least two groups of formula —CH$_2$OR, where R denotes a hydrogen atom or a methyl or ethyl group, and (iii) water.

2. A composition according to claim 1, containing 10 to 90% by weight of water.

3. A composition according to claim 1, wherein the said aliphatic group contains a chain of at least 8 consecutive carbon atoms.

4. A composition according to claim 1, wherein the polyester has an average molecular weight of between 800 and 20,000.

5. A composition according to claim 1, wherein the said carboxyl-containing polyester is one obtainable by the esterification of (a) an aliphatic, aromatic, or cycloaliphatic compound containing at least two carboxylic acid groups, or at least one carboxylic anhydride group, (b) an aliphatic, cycloaliphatic, or araliphatic compound containing at least two alcoholic hydroxyl groups or at least one 1,2-epoxide group, at least one of (a) and (b) having one or more mercaptan groups directly attached to aliphatic carbon atoms and at least one of (a) and (b) furnishing the said aliphatic group of at least 8 and at most 60 carbon atoms.

6. A composition according to claim 5, wherein the said carboxyl-containing polyester is one obtainable by the esterification of (a) as aforesaid,
(b) as aforesaid, and
(c) an aliphatic, aromatic, or cycloaliphatic compound having at least one carboxylic acid group, at least one of (a), (b), and (c) having one or more mercaptan groups directly attached to aliphatic carbon atoms.

7. A composition according to claim 5, wherein the said carboxyl-containing polyester is one obtainable by the esterification of (a) as aforesaid,
(b) as aforesaid, and
(d) an aliphatic, cycloaliphatic, or araliphatic compound containing only one alcoholic hydroxyl group.

8. A composition according to claim 1, wherein the polyester is one obtainable by the esterification, simultaneously or in any desired sequence, of (e) a saturated or ethylenically unsaturated aliphatic or aliphatic-cycloaliphatic mono-, di-, or tri-carboxylic acid having an aliphatic group of at least 8 and at most 60 carbon atoms, (f) a monomercaptanmonocarboxylic acid or a monomercaptanmonohydric alcohol, (g) a compound containing two, but not more than two, alcoholic hydroxyl groups per molecule, and (h) a compound containing, per molecule, at least three carboxylic acid groups, at least one of (a), (b), and (d) having one or more mercaptan groups directly attached to aliphatic carbon atoms and at least one of (a), (b), and (d) furnishing the said aliphatic group of at least 8 and at most 60 carbon atoms.

9. A composition according to claim 1, wherein the polyester is one obtainable by the esterification, simultaneously or in any desired sequence, of (e) a saturated or ethylenically unsaturated aliphatic or aliphatic-cycloaliphatic mono-, di-, or tri-carboxylic acid having an aliphatic group of at least 8 and at most 60 carbon atoms, (j) a monomercaptandicarboxylic acid, and (k) a compound containing at least two, but not more than six, alcoholic hydroxyl groups per molecule.

10. A composition according to claim 1, wherein the polyester is one obtainable by the esterification, simultaneously or in any desired sequence, of (e) a saturated or ethylenically unsaturated aliphatic or aliphatic-cycloaliphatic mono-, di-, or tri-carboxylic acid having an aliphatic group of at least 8 and at most 60 carbon atoms, (j) a monomercaptandicarboxylic acid, and (k) a compound containing at least two, but not more than six, alcoholic hydroxyl groups per molecule, and (l) a dicarboxylic acid containing no mercaptan group, or an anhydride of such an acid.

11. A composition according to claim 1, wherein the polyester is one obtainable by the esterification, simultaneously or in any desired sequence, of (e) a saturated or ethylenically unsaturated aliphatic or aliphatic-cycloaliphatic mono-, di-, or tri-carboxylic acid having an aliphatic group of at least 8 and at most 60 carbon atoms, (j) a monomercaptandicarboxylic acid, and (k) a compound containing at least two, but not more than six, alcoholic hydroxyl groups per molecule, and (m) a monocarboxylic acid or a monohydric alcohol.

12. A composition according to claim 1, wherein the polyester is one obtainable by the esterification, simultaneously or in any desired sequence, of (e) a saturated or ethylenically unsaturated aliphatic or aliphatic-cycloaliphatic mono-, di-, or tri-carboxylic acid having an aliphatic group of at least 8 and at most 60 carbon atoms, (j) a monomercaptandicarboxylic acid, and (k) a compound containing at least two, but not more than six, alcoholic hydroxyl groups per molecule, (l) a dicarboxylic acid containing no mercaptan group, or an anhydride of such an acid, and (m) a monocarboxylic acid or a monohydric alcohol.

13. A composition according to claim 1, wherein the polyester is one obtainable by the esterfication, simultaneously or in any desired sequence, of (e) a saturated or ethylenically unsaturated aliphatic or aliphatic-cycloaliphatic mono-, di-, or tri-carboxylic acid having an aliphatic group of at least 8 and at most 60 carbon atoms, (f) a monomercaptanmonocarboxylic acid or a monomercaptanmonohydric alcohol, (o) a compound containing at least three alcoholic hydroxyl groups per molecule, and (p) a compound containing two, but not more than two, carboxylic acid groups per molecule.

14. A composition according to claim 1, wherein the polyester is one obtainable by the esterification of (j) a monomercaptandicarboxylic acid and
(q) a compound containing at least two, but not more than six, alcoholic hydroxyl groups per molecule and which contains a chain of at least 8 consecutive carbon atoms which may be interrupted by ether oxygen atoms or carbonyloxy groups.

15. A composition according to claim 14, wherein the polyester is one obtainable by the esterfication of
(j) as aforesaid,
(q) as aforesaid, and
(f) a monomercaptanmonocarboxylic acid or a monomercaptanmonohydric alcohol.

16. A composition according to claim 1, wherein the polyester is obtained by the esterification of
(l) a dicarboxylic acid containing no mercaptan group, or an anhydride of such an acid, and
(r) a compound containing, per molecule, at least two alcoholic hydroxyl groups and at least 8 consecutive carbon atoms which may be interrupted by ether oxygen atoms.

17. A composition according to claim 1, wherein the salt (i) of the polyester is prepared by addition of 50% to 150% of the theoretical quantity (based on the carboxyl content of the polyester) of ammonia, a quaternary ammonium hydroxide, or an amine, to the ester or vice versa.

18. A composition according to claim 1, wherein the amine is a primary, secondary, or tertiary alkylamine, an alkanolamine, a cycloaliphatic amine, or a N-heterocyclic amine.

19. A composition according to claim 1, wherein the aminoplast (ii) is a N-hydroxymethyl or N-methoxymethyl derivative of urea, melamine, acetoguanamine, benzoguanamine, or lauroguanamine.

* * * * *